Figure 2:
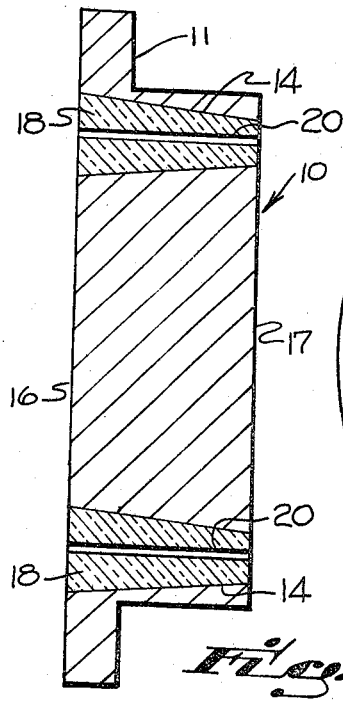
Figure 1:
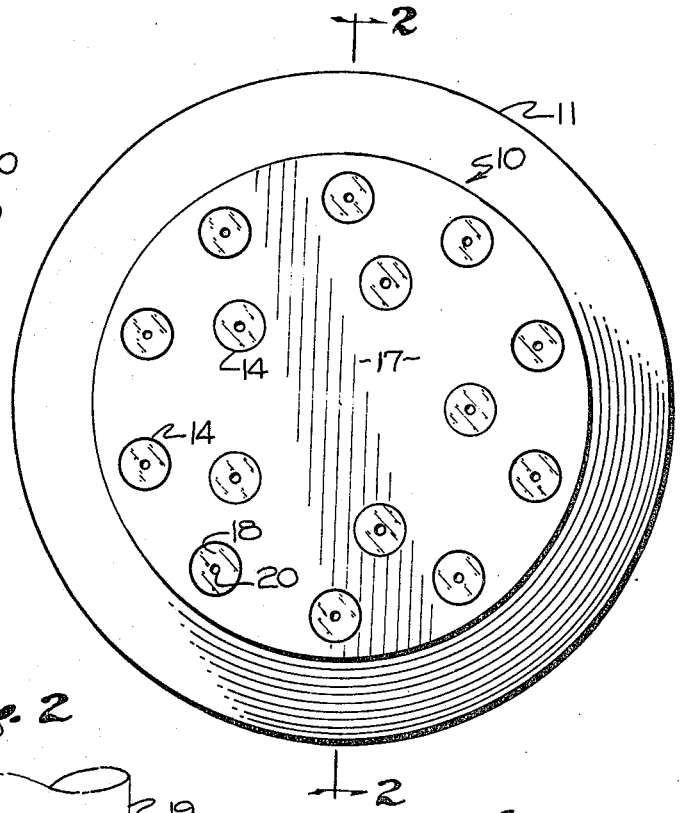
Figure 3:
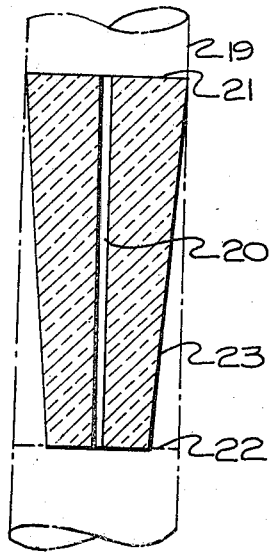
Figure 4:
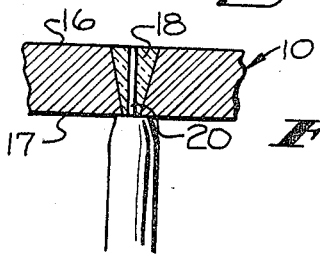
Figure 5:
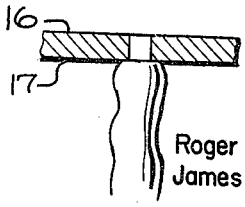

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 714

T869,016

SPINNING METHOD FOR SPANDEX TYPE FIBERS

Roger M. Schulken, Jr., and James R. G. Pearman, both of P.O. Box 511, Kingsport, Tenn. 37662

Continuation of application Ser. No. 656,813, July 28, 1967. This application Aug. 11, 1969, Ser. No. 850,335

Int. Cl. D01f

U.S. Cl. 264—204

1 Sheet Drawing. 19 Pages Specification

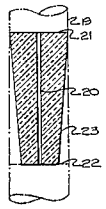

Method for manufacturing textile fibers that includes a step of extruding a solution of fiber forming material through a plurality of substantially cylindrical orifices in a spinneret plate, said orifices having substantially uniform cross-section throughout a substantial proportion of a cylindrical length, passing said extruded solution into a fluid medium such as that normally found in a spinning cabinet whereby fibers are formed, and collecting said fibers, the improvement comprising having said length to effective diameter ratio of said orifices between about 5 and about 200, and collecting said fibers at the rate of at least about 200 feet per minute, said improvement being especially characterized in that the fibers are comprised of an elastomeric polyurethane-derived polymer. The rate of production of such polyurethane-derived polymers (spandex polymers) is increased substantially by this process as compared to using the same process for spinning solutions of other fiber forming materials such as vinyl chloride, vinyl acetate, acrylonitrile, modacrylics, cellulose esters such as cellulose acetate, nylon, polyesters such as polyethylene terephthalate, polyethylene, polypropylene, etc. Especially good results with spandex fiber spinning are obtained when the length to diameter ratio is between about 28 and about 75.

Dec. 16, 1969 R. M. SCHULKEN, JR., ET AL T869,016

SPINNING METHOD FOR SPANDEX TYPE FIBERS

Original Filed July 28, 1967

Roger M. Schulken, Jr.
James R. G. Pearman
INVENTORS

BY William T. French
Charles L. Grant